June 12, 1951 J. E. SCOTT Re. 23,379
MATERIAL FEED MECHANISM FOR SEWING MACHINES
Original Filed Jan. 3, 1944 3 Sheets-Sheet 1
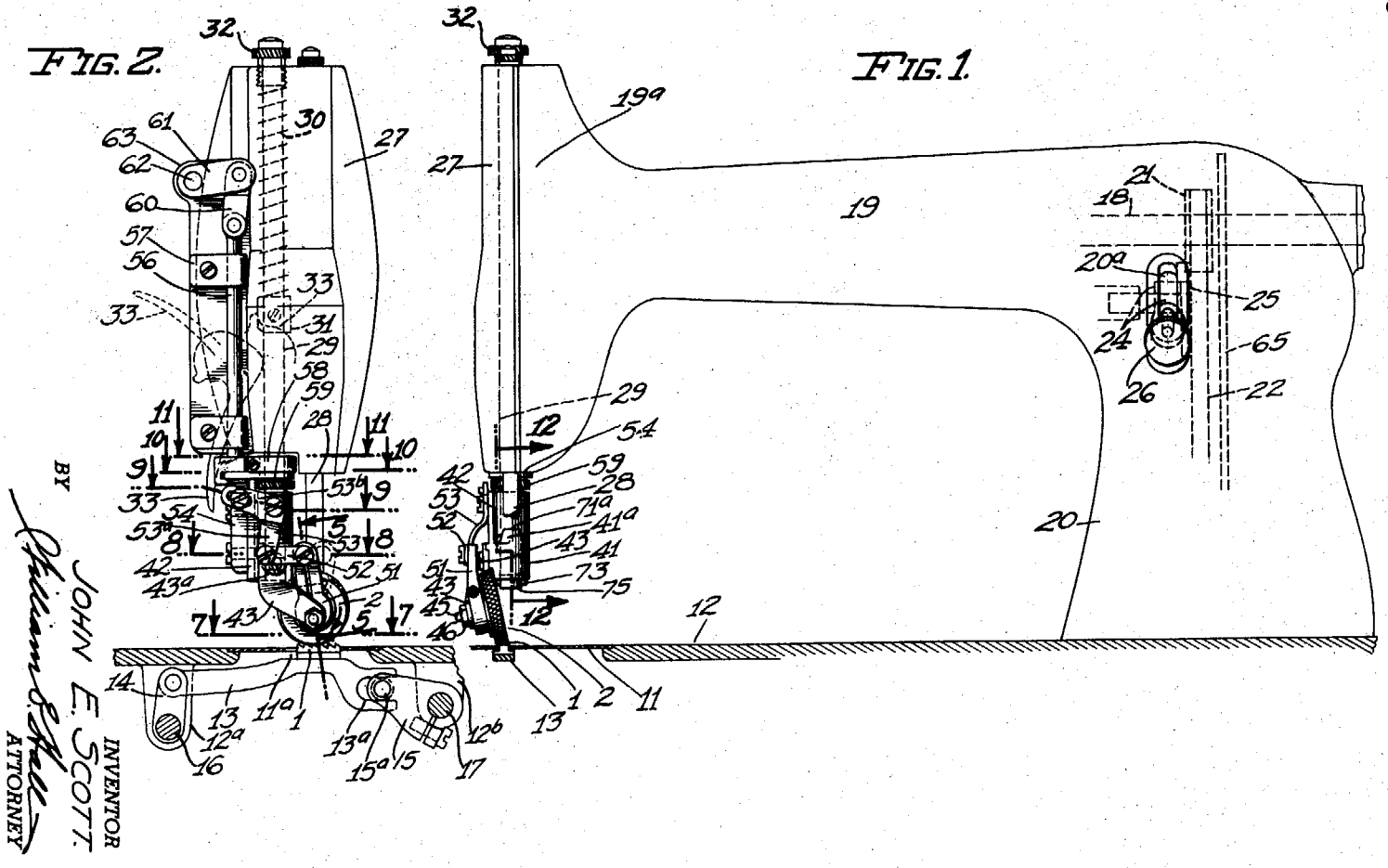
INVENTOR
JOHN E. SCOTT.
BY William B. Hall
ATTORNEY June 12, 1951 J. E. SCOTT Re. 23,379
MATERIAL FEED MECHANISM FOR SEWING MACHINES
Original Filed Jan. 3, 1944 3 Sheets-Sheet 2
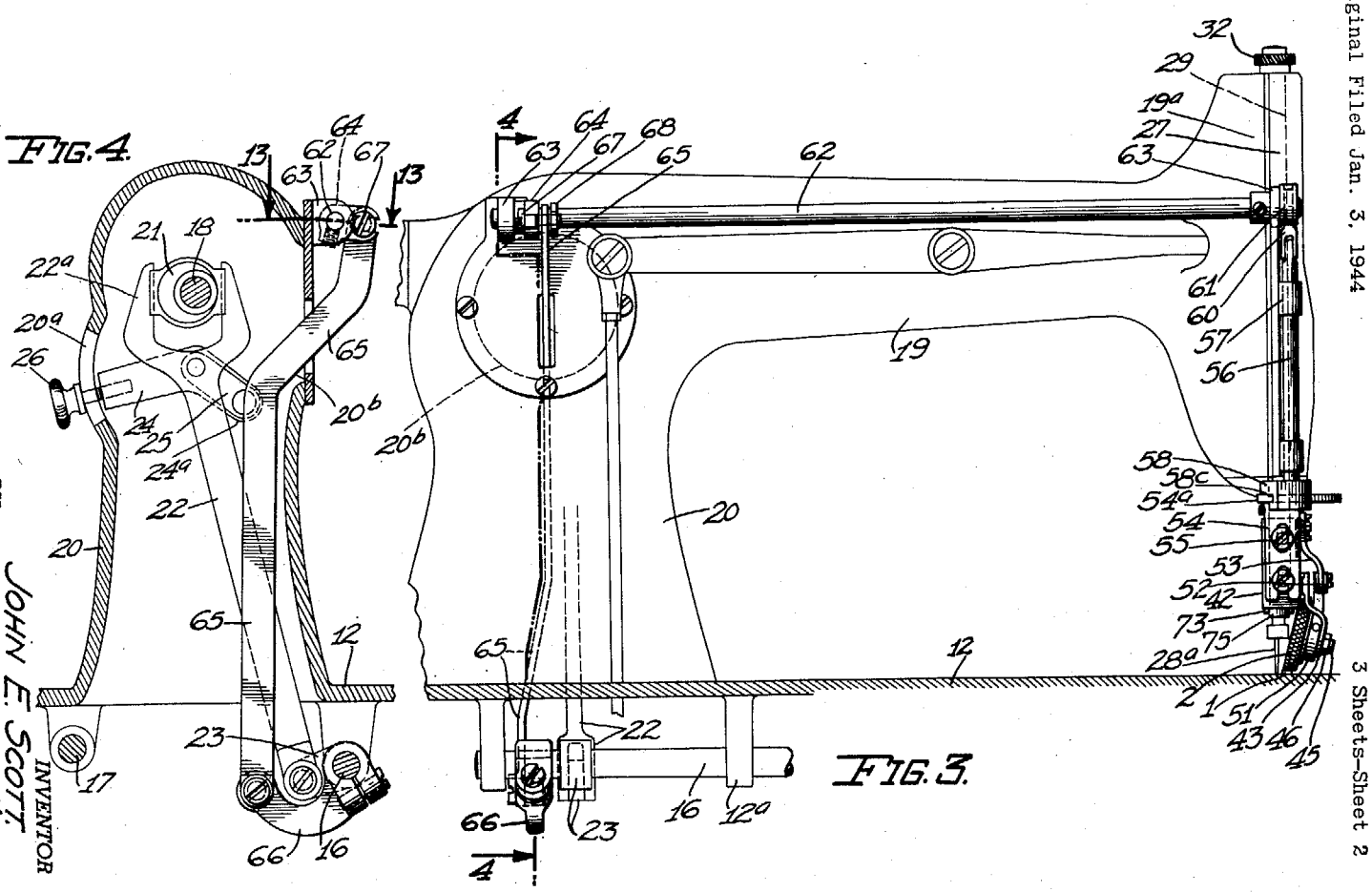
INVENTOR
JOHN E. SCOTT.
BY William E. Hall
ATTORNEY

MATERIAL FEED MECHANISM FOR SEWING MACHINES

Original Filed Jan. 3, 1944 3 Sheets-Sheet 3

INVENTOR
JOHN E. SCOTT.
BY William C. Hall
ATTORNEY

Reissued June 12, 1951

Re. 23,379

UNITED STATES PATENT OFFICE 23,379

MATERIAL FEED MECHANISM FOR SEWING MACHINES

John E. Scott, Los Angeles, Calif.

Original No. 2,407,907, dated September 17, 1946, Serial No. 516,752, January 3, 1944. Application for reissue September 15, 1947, Serial No. 774,070

9 Claims. (Cl. 112—214)

Matter enclosed in heavy brackets [ ] appears in the original patent but forms no part of this reissue specification; matter printed in italics indicates the additions made by reissue.

My present invention relates to sewing machines, and more particularly to the material feed mechanism therefor.

In sewing together, by means of the conventional sewing machine or by mechanical means, two or more pieces of sheet material, whether they be fabric, felt, leather, rubber, fibre, paper, or the like, or whether the two or more pieces be of the same material or not, one piece of material, and generally the upper one, stretches or draws with respect to the lower piece or pieces, producing either an irregular seam, or a drawing, stretching, or shirring between the two or more pieces sewed together or between two adjacent rows of stitching. Such sewing prevents the two or more pieces of material cut from a pattern to the desired shape, to match properly, or prevents all of the pieces of the material sewed together by a single row or more rows of stitching to bear or carry the same load or stress, which often is important in sewing together two or more pieces of material.

One of the principal objects of this invention is to provide a sewing machine which will eliminate the above mentioned defects, and which will eliminate all stretching, drawing, or shirring of one piece or sheet with respect to the other piece or pieces or sheets of material desired to be sewed together, thereby preventing the various undesirable effects resulting when one piece is pulled, stretched, drawn, or shirred with respect to the other.

*An important feature of this invention is to provide a novel and simple construction whereby an intermittently revolving feed wheel may have a peripheral portion positioned adjacent and movable substantially simultaneously with the walking feed to feed two or more sheets therebetween and thereby, and a construction of this class having, adjacent or in co-operation with the walking feed, a stationary friction-producing means which facilitates the holding of the feed roller against rotation between the periods of intermittent rotation thereof.*

Another important object of this invention is to provide a mechanism, for effecting the above result, which is used in connection with the conventional feed of the sewing machine, which may be easily raised from or clear of the material as in the case of the raising of the presser foot of the conventional sewing machine, and which may be readily shifted out of the way for threading, removing, or replacing the sewing machine needle.

An important object also of this invention is to provide a mechanism of this class which will operate in unison or synchronism with the conventional feed of the sewing machine; an important object also being to provide a mechanism of this class which may be readily operatively connected with the operating mechanism of the conventional machine.

Still another important object of this invention is to provide a feed mechanism of this class in conjunction with the conventional feed of the sewing machine which may be readily adjusted simultaneously with the latter feed to vary the length of the stitch of the machine, and also a device of this class in which the movement thereof may be readily adjusted with respect to that of the conventional feed, in order to vary the feed of the upper piece or sheet of material with respect to the lower, depending upon its characteristics as to stretching or drawing.

A further object of this invention is to provide a mechanism of this class in the form of an attachment which may be readily applied to present sewing machines for carrying out the purposes intended and mentioned.

With these and other objects in view, as will appear hereinafter, I have devised a feed mechanism for sewing machines, having certain novel features of construction, combination, and arrangement of parts and portions, as will be hereinafter described in detail, and set forth in the appended claims, reference being had to the accompanying drawings, and to the characters of reference thereon, which form a part of this application, in which:

Fig. 1 is a fragmentary front *side* elevation of a sewing machine embodying my invention;

Fig. 2 is a front end elevation of the head of the machine, and showing the bed fragmentarily and in section;

Fig. 3 is a fragmentary rear *side* elevation of the machine, showing parts broken away and in section to facilitate the illustration;

Fig. 4 is a sectional elevation of the rear end of the machine head, taken on line 4—4 of Fig. 3;

Figure 12:
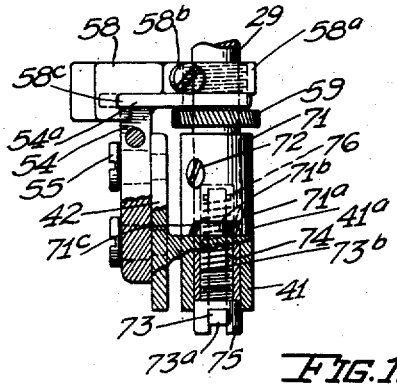
Figure 13:
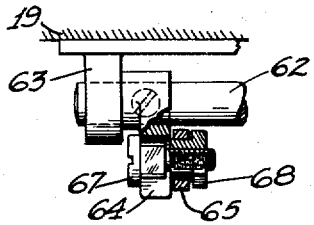

Figs. 8, 9, 10, and 11, are enlarged sectional views in plan, taken, respectively, on lines 8—8, 9—9, 10—10, and 11—11, of Fig. 2, showing sections of the various portions of my mechanism;

Fig. 12 is an enlarged fragmentary sectional elevational view, taken substantially on the line 12—12 of Fig. 1, showing particularly the mounting of the rotatable support on the presser bar for supporting the feed roller and the mechanism for operating the same; and, Fig. 13 is an enlarged fragmentary sectional view, taken on line 13—13 of Fig. 4, showing a means for adjusting the extent of the rotation of the feed roller.

In the drawings, I have shown my material feed mechanism as an attachment to a conventional sewing machine, and specifically to a Singer sewing machine, No. 3120, but it is obvious that my invention may be embodied in or as an inherent part of the mechanism of the sewing machine itself.

The conventional sewing machine is provided with a feed, sometimes referred to as a walking or drop feed, designated 1 in the drawings, and above and in co-operation with this feed is commonly provided a presser foot, either in the form of a foot-like member or a roller. My invention consists primarily of a roller, designated 2, and the surface or periphery of this roller is positively fed or rotated in co-operation with the feed 1, at the same surface speed or feed thereof or at slightly varying speed with respect thereto, as will be hereinafter described in detail.

The walking feed 1, in the conventional machine, extends through and above the throat plate 11 mounted on the bed 12 of the sewing machine, and is carried in its various movements by the feed bar 13, located below the bed 12. This bar is supported at its rear end by a feed crank arm 14, and at its front end by the free end of the rock shaft crank 15. It is pivotally connected to the free end of the arm which is fixed to the rock shaft 16 supported on brackets 12a, depending from the bed. The crank 15 is secured to the feed rock shaft 17, which is supported on brackets 12b also depending from the bed. The bar pin 15a at the free end of the crank 15 extends into a bifurcated portion 13a at the front end of the bar opposite the pivotal connection thereof with the arm.

The conventional machine has an operating mechanism or power unit in connection with the head, for operating the main or arm shaft 18, which is mounted in and extends through the hollow arm 19, the shaft extending from the supported or pedestal end of the hollow arm to the free end thereof. The pedestal end is supported on a hollow pedestal 20 mounted on one end of the bed 12. The arm shaft has a cam 21 which is adapted to ride between the furcations 22a of the feed forked connection 22, which extends downwardly through the pedestal 20. The lower end of this feed forked connection is pivotally connected to the free end of the crank 23 on the said rock shaft 16, for rocking or oscillating the latter. A feed regulator 24 is pivotally mounted intermediate its ends at *and on* the upper end of the pedestal, and one end 24a thereof is pivotally connected by a link 25 to the head of the feed forked connection immediately below the forked portion of the latter, *the latter connection of the link 25 to the forked connection member 22 providing a swinging pivotal mounting for the latter.* The opposite end of the feed regulator 24 is held in an adjusted position by a thumb screw 26, the shank of which extends through a vertical slot 20a in the front side of the pedestal. Vertical movement of the thumb screw 26 varies the lengthwise movement of the walking feed 1, and thereby the length of the stitch of the machine, in the conventional manner, well known to the art.

At the free end of the overhanging arm is a bar housing 19a normally covered at its outer or front side by a removable cover or face plate 27. Within the housing are reciprocally mounted, in vertical directions, the usual needle bar 28 and the presser bar 29, the former operating the usual sewing machine needle at its lower end and the latter supporting the usual presser foot.

The presser bar is resiliently held in a downward position by a compression spring 30 positioned around the bar and located between an adjustable collar 31, intermediate the ends of the bar, and a screwable adjusting bushing 32 at the upper end of the bar housing 19a. This presser bar in the conventional machine is raised from its lower operating position, opposite and over the feed 1, by a presser bar lifting lever 33 located at the back side of the bar housing.

Figure 9:
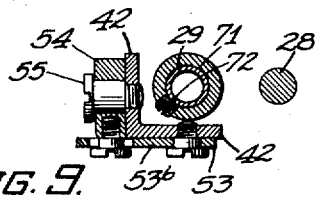
Figure 8:
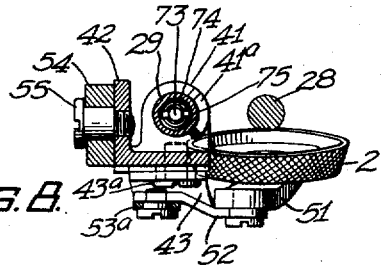

The presser roller 2, of my invention, is supported at and by the lower end of the presser bar 29, as shown in Figs. 1, 2, and 3, in place of the conventional presser foot. The mechanism for supporting this roller consists essentially of the rotatable support 41, a roller bracket support 42, and a roller supporting bracket 43. The rotatable support 41 is carried on the bar 29 and is [reciprocal] *reciprocable* in a vertical and rotatable in a horizontal direction thereon, as will be hereinafter more particularly described. The roller bracket support 42, which has an angle shape, as shown in Figs. 8 and 9, is secured at its lower end *portion* to the outer side of the rotatable support 41 and may be an integral part thereof, as shown. The roller bracket 43 is also secured to the lower portion and to the outer or front side of the bracket support 42 and extends at an angle downwardly therefrom in the direction of the needle bar. The roller bracket 43 is shown secured to the bracket support 42 by a screw 43a, this screw extending through a horizontal slot in the bracket to allow horizontal adjustment of the latter, as shown in Figs. 2 and 8.

On the extended lower end of the bracket is secured a bearing stud 45 which is locked with respect thereto by a lock nut 46. On the head end of the stud, which extends towards the needle carried on the needle bar, is rotatably mounted a hub 47. The bearing portion of the stud is conical and tapers from a large diameter outer end toward the shank end which is secured to the bracket. On the [extended] end *portion* of the hub, *which extends around the large portion of the stud,* is mounted the roller 2, the roller being connected with the hub 47 by a Horton or other ratchet clutch 48 in such a manner that the positive forward movement of the surface or peripheral portion of the roller is in the direction of the walking feed 1. The rotating axis of the roller is at an angle, as shown best in Fig. 1, so that the lower peripheral portion of the roller is positioned above the walking feed 1, and without interfering with the normal operation of the needle. The surface or peripheral portion of the roller is knurled or serrated to facilitate the feed of the material to and from the needle.

Figure 10:
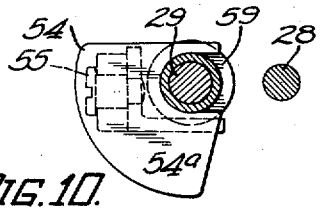

The hub 47 is rotated by means of a roller rotating arm 51, the lower end thereof being bifurcated and frictionally clamped around the hub by a screw 51[a]. The upper end of the roller rotating arm is pivotally connected, by means of a link 52 to the lower arm 53[a] of a bell-crank 53 which is pivotally mounted at the upper end of the outer side of the roller bracket support 42. The other arm 53[b] of the bell-crank 53 is pivotally connected to the outer edge of the roller shifting and operating swivel 54, which is reciprocally connected, by means of screws 55, to the rear flange of the roller bracket support 42. The swivel 54 is reciprocated in a vertical direction by means of a roller feed reciprocating rod 56 which is supported at its opposite ends in brackets 57 mounted on the cover or face plate 27. The rod 56 has a crosshead 58 at its lower end, one end of the crosshead being slidable on the lower [end] *portion* of the presser bar 29. The slidable mounting of the crosshead 58 on the presser bar is by means of a bushing 59 screwably clamped in the latter end of the crosshead by the clamp 58[a] which is secured to the crosshead by a screw 58[b]. The swivel 54 is provided at its upper end with a laterally extended flat quadrant portion 54[a], which is pivotally mounted on the shank of the bushing 59 below the crosshead. As shown in Fig. 10, this portion 54[a] straddles the bushing 59. The opposite end or periphery of the portion 54[a] is arcuate with respect to the axis of the bushing and is slidably mounted in an arcuate groove 58[c] also with the center of the bushing as its axis.

The rotatable support 41, which is carried at the lower end of the presser bar 29, is resiliently held against the lower end of the rotatable support positioning or locking member 71, which is also mounted on the presser bar, and is secured thereto by a screw 72. The rotatable support is resiliently forced in an upward direction by the cross bar 73[a] of a plunger 73, the shank 73[b] of which extends into the lower end of the presser bar, as shown best in Fig. 12. Around the shank is positioned a coil spring 74 which is located between the inner end of a screw plug 75[, at] *in* the bottom *end* of the presser bar, and a pin 76 at the inner end of the plunger. The cross bar 73[a] is slidable axially in the head of the screw plug, the ends of the cross bar extending beyond the head and engaging *and supporting* the lower end of the rotatable support 41.

The support 41 has an upwardly extending tapered or key lug 41[a] which, when the roller 2 is in the normal sewing position shown in Figs. 1 and 12, is seated in a correspondingly tapered notch 71[a] at the lower end of the positioning or locking member 71. When the support 41 is depressed against the spring 74, that is, after the presser bar has been raised by the lifting lever 33, the support 41 may be turned in a clockwise direction about the presser bar 29, permitting the crest of the lug 71[a] to ride against the ledge 71[b] located below the end of the notch 71[a]. This permits the support 41, which supports the roller 2, to be shifted out of the way, through an angle of approximately 90°, so that the needle 28[a] in the needle bar 28 may be threaded, removed, or replaced. This rotation of the support 41 is limited by the engagement of the lug 41[a] with the stop 71[c] at the end of the ledge 71[b].

The upper end of the roller feed reciprocating rod 56 is pivotally connected, by means of a link 60 to the end of an arm 61, which is secured to the front end of the roller feed rock shaft 62. This rock shaft is mounted at its opposite ends on brackets 63, which are positioned at the rear side and upper portion of the arm 19 of the sewing machine head. At the rear end of the rock shaft 62 is provided another arm 64, which will be referred to as the roller feed rock shaft operating arm. The end of the operating arm is pivotally connected, by means of a roller feed connecting rod 65 to the end of a roller feed crank 66, which is also mounted on the feed rock shaft 16. However, the crank 66 is longer than the crank 23, as shown best in Fig. 4.

The pivotal connection of the connecting rod 65 to the operating arm 64 is by means of a screw or stud 67. This stud extends through a slotted or bifurcated portion at the extended end of the arm 64, and is frictionally secured in the desired adjusted position by means of the roller feed adjusting nut 68. The upper end of the connecting rod 65 is rotatably mounted on a bearing portion of this nut, as shown best in Fig. 13.

Thus, as the shaft 16 is rocked, the connecting rod 65 rocks the shaft 62, which in turn reciprocates the rod 56, *vertically* reciprocating the swivel 54, rocking the bell-crank 53 on the support 42, oscillating the roller rotating arm 51, rotating the hub 47 and thus rotating the roller 2. The rotation of the roller 2 in a counterclockwise direction, as indicated by the arrow in Fig. 2, takes place on the down stroke of the reciprocating rod 56, and therefore of the upward movement of the free end of the crank 66.

*It will be seen that the radial adjustment of the stud 67 with respect to the axis of the shaft 62 varies the amount or angular movement of the roller 2, that is, the distance of the movement of the periphery of the roller, thus varying the surface feed of the roller 2 with respect to the lineal feed of the member 1.*

It will be noted that the [rotation] *swinging* of the roller about the vertical axis of the presser bar does not disrupt the operative connection between the oscillating roller rock shaft 62 and the arm which directly rotates the roller, the swivel connection of the quadrant portion 54[a] of the roller shifting and operating swivel 54 with the crosshead 58 permitting such shifting of the roller 2.

Since the roller is carried at the lower end of the presser bar it may readily be raised clear of the material on the walking feed 1, by depressing or otherwise operating the presser bar lifting lever 33.

Figure 5:
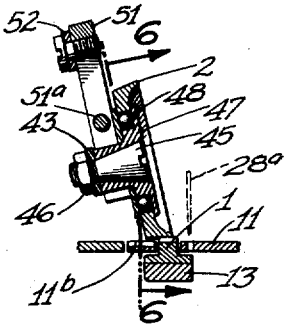
Fig. 5 is an enlarged sectional elevational view through the feed roller, and a fragmentary portion of the throat plate and the walking feed extending therethrough, the section being taken on line 5—5 of Fig. 2.
Figure 6:
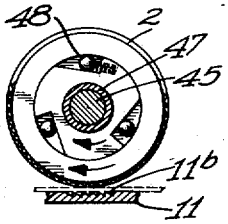
Fig. 6 is a transverse sectional view through the roller bearing, taken substantially on the line 6—6 of Fig. 5.
Figure 7:
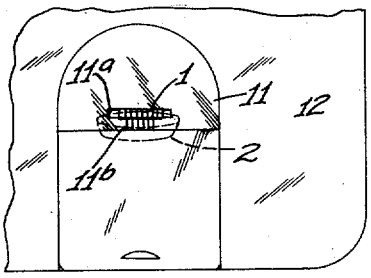
Fig. 7 is a fragmentary view in plan, taken on the line 7—7 of Fig. 2, showing the machine bed, the throat plate thereon, and the walking feed and associated parts, as well as showing the feed roller by dotted lines.
Figure 11:
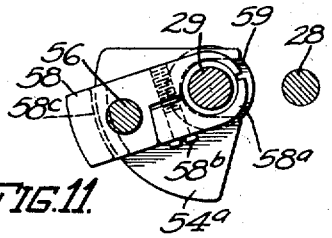

[The] *In the* portion between the slot 11[a], in the throat plate 11, through which the feed 1 operates, and the outer edge of this plate, *as shown in Figs. 5 and 7*, is a short serrated *or friction-producing* portion 11[b], which, together with a portion of the walking feed, is positioned immediately below the roller. The teeth of the serrated portion are shaped substantially like the teeth of the feed 1. The purpose of the serrated portion 11[b] is to prevent return of the sewed material as well as to facilitate the holding of the roller while the clutch arm is returned to a forward position for the next stroke to rotate the roller.

Though I have shown and described a particular construction, combination, and arrangement of parts and portions, and a certain embodiment of my invention in an attachment, I do not wish to be limited to the same, but desire to include in the scope of my invention the construction, combination, and arrangement substantially as set forth in the appended claims.

I claim:

[1. In a feed mechanism of the class described, the combination with a sewing machine having a walking feed and means for operating the same, of a roller positioned above and opposite said feed, a support on the machine for the roller, means, connected to the operating means, for intermittently and positively rotating the roller for moving the peripheral portion thereof in the direction of and simultaneously with the movement of the walking feed, unitary means for simultaneously adjusting the stroke of the walking feed and of the roller, and means in association with the roller for varying the extent of intermittent rotation thereof.]

2. In a feed mechanism of the class described, the combination with a sewing machine having a walking feed, means for operating the same, and a presser bar, of a roller positioned above and opposite said feed, a support on the machine for the roller, means[,] connected to the operating means, for intermittently and positively rotating the roller for moving the peripheral portion thereof in the direction of and simultaneously with the movement of the walking feed, said support being pivotally supported on a vertical axis on the presser bar, means for raising the presser bar and roller, and means in connection with the support and the presser bar for detachably locking the roller for normal sewing operation against shifting about said vertical axis.

3. In a feed mechanism of the class described, the combination with a sewing machine having a walking feed, means for operating the same, and a presser bar, of a roller positioned above and opposite said feed, a support on the machine for the roller, means[,] connected to the operating means for rotating the roller, a ratchet clutch for connecting the rotating means to the roller for effecting positive rotation of the roller in one direction to feed material in the direction of the normal movement of the feed, said clutch being adapted to permit free movement of the rotating means in the opposite direction with respect to the roller, said support being rotatably mounted on the lower end of and coaxial with the presser bar, means for raising the presser bar and roller, and means in connection with the support and the presser bar for detachably locking the roller for normal sewing operation against shifting about said vertical axis.

4. In a material feed attachment of the class described for a sewing machine having a bed, an overhanging arm supported at one end on said bed, a walking feed mounted in said bed below the free end of the arm, means at the supporting end of the arm for operating said feed, and a presser bar reciprocally mounted in a vertical direction at the free end of the arm, said attachment comprising a roller supported at the lower end of the presser bar above and opposite said feed, a ratchet clutch for the roller, means connecting said clutch to said operating means for effecting positive rotation of the roller to feed material in the direction of the movement of the feed and permit free movement of the connecting means in the opposite direction with respect to the roller, said roller being carried by the presser bar and adapted to be lifted thereby for raising the roller above the material, said roller being rotatable about the vertical axis of said bar, and means in connection with the roller and the bar for detachably locking the roller against movement about said vertical axis.

5. In a feed mechanism of the class described, the combination with a sewing machine having a bed, an overhanging arm supported at one end of the bed, a walking feed mounted in said bed below the free end of the arm, means for operating the walking feed, and a presser bar reciprocally mounted in a vertical direction at the free end of the arm, of roller supporting means pivotally mounted on the lower end of the presser bar and coaxially therewith, a roller on the supporting means, means[,] connected to the operating means, for intermittently and positively rotating the roller for moving the peripheral portion thereof in the direction of and simultaneously with the movement of the walking feed, a rock shaft mounted on said overhanging arm operatively connected to said operating means, a connecting rod reciprocally mounted in a vertical direction at the free end of the arm and operatively connected to said rock shaft, a crosshead at the lower end of the connecting rod and slidable on the presser bar, a swivel member connected to and reciprocable in a vertical direction with respect to the supporting means, said swivel member being slidably connected with the crosshead on an arc with the axis of the presser bar as a center, and a bell-crank pivotally mounted on the supporting means with one arm pivotally connected to the swivel member and with the other arm connected to the roller operating means.

6. In a feed mechanism of the class described, the combination with a sewing machine having a bed, an overhanging arm supported at one end of the bed, a walking feed mounted in said bed below the free end of the arm, means for operating the walking feed, and a presser bar reciprocally mounted in a vertical direction at the free end of the arm, of roller supporting means pivotally mounted on the lower end of the presser bar and coaxially therewith, a roller on the supporting means, means[,] connected to the operating means, for intermittently and positively rotating the roller for moving the peripheral portion thereof in the direction of and simultaneously with the movement of the walking feed, a rock shaft mounted on said overhanging arm operatively connected to said operating means, a connecting rod reciprocally mounted in a vertical direction at the free end of the arm and operatively connected to said rock shaft, a crosshead at the lower end of the connecting rod and slidable on the presser bar, a swivel member connected to and reciprocable in a vertical direction with respect to the supporting means, said swivel member being slidably connected with the crosshead on an arc with the axis of the presser bar as a center, a bell-crank pivotally mounted on the supporting means with one arm pivotally connected to the swivel member and with the other arm connected to the roller operating means, and means for detachably locking the roller supporting means against rotary movement about the presser bar for normal sewing operation of the machine, said supporting means and roller being shiftable in a clock-wise direction about the presser bar when the detachable locking means is released.

7. In a feed mechanism of the class described, the comination with a sewing machine having a bed, an overhanging arm supported at one end of the bed, a walking feed mounted in said bed below the free end of the arm, means of operating the walking feed, and a presser bar reciprocally mounted in a vertical direction at the free end of the arm, of a roller supporting means pivotally mounted on the lower end of the presser bar and coaxially therewith, a roller, a ratchet clutch for rotatably and controllably supporting the roller on the supporting means, a rock shaft mounted on said overhanging arm, operatively connected to said operating means, a connecting rod reciprocally mounted in a vertical direction at the free end of the arm and operatively connected to said rock shaft, a crosshead at the lower end of the connecting rod and slidable on the presser bar, a swivel member connected to and reciprocable in a vertical direction with respect to the supporting means, said swivel member being slidably connected with the crosshead an an arc with the axis of the presser bar as a center, and a bell-crank pivotally mounted on the supporting means with one arm pivotally connected to the swivel member, the clutch having an arm radiating from the axis of the roller, the other arm of the bell-crank being connected to the end of said clutch arm.

8. In a feed mechanism of the class described, the combination with a sewing machine having a bed, an overhanging arm supported at one end of the bed, a walking feed mounted in said bed below the free end of the arm, means for operating the walking feed, and a presser bar reciprocally mounted in a vertical direction at the free end of the arm, of a roller supporting means pivotally mounted on the lower end of the presser bar and coaxially therewith, a roller, a rachet clutch for rotatably and controllably supporting the roller on the supporting means, a rock shaft mounted on said overhanging arm, and operatively connected to said operating means, a connecting rod reciprocally mounted in a vertical direction at the free end of the arm and operatively connected to said rock shaft, a crosshead at the lower end of the connecting rod and slidable on the presser bar, a swivel member connected to and reciprocable in a vertical direction with respect to the supporting means, said swivel member being slidably connected with the crosshead on an arc with the axis of the presser bar as a center, a bell-crank pivotally mounted on the supporting means with one arm pivotally connected to the swivel member, the clutch having an arm radiating from the axis of the roller, the other arm of the bell-crank being connected to the ends of said clutch arm, and means for detachably locking the roller supporting means against rotary movement about the presser bar for normal sewing operation of the machine, said supporting means and roller being shiftable in a clock-wise direction about the presser bar when the detachable locking means is released.

*9. In a feed mechanism of the class described, the combination with a sewing machine having a walking feed and means for operating the same, of a roller positioned above and opposite said feed, a support on the machine for the roller, means connected to the operating means, for intermittently and positively rotating the roller for moving the peripheral portion thereof in the direction of and simultaneously with the movement of the walking feed, said support being pivotally supported on a substantially vertical axis on the machine for swinging the roller backwardly about said axis from co-operation with the walking feed.*

*10. In a feed mechanism of the class described, the combination with a sewing machine having a bed, a walking feed having a feed portion extending above the bed, means for operating the same, and a stationary friction-producing portion positioned alongside the walking feed, of a feed roller having, at its periphery, a substantially flat face positioned above the walking feed and the friction-producing portion and extending partially over both of the latter, a support on the machine for the roller, and means connected to the operating means, for intermittently rotating the roller for moving the peripheral portion thereof, adjacent the walking feed, in the direction of and substantially simultaneously with the movement of the latter, said stationary friction-producing portion facilitating the holding of the roller at rest between the periods of intermittent rotary movement thereof.*

JOHN E. SCOTT.

REFERENCES CITED

The following references are of record in the file of this patent or the original patent:

UNITED STATES PATENTS

| Number | Name | Date |
|---|---|---|
| 120,614 | Barth et al. | Nov. 7, 1871 |
| 1,100,373 | Hugg | June 16, 1914 |
| 1,145,605 | Moffatt | July 6, 1915 |
| 1,348,133 | Thorne | July 27, 1920 |
| 1,988,372 | Christensen et al. | Jan. 15, 1935 |
| 2,197,255 | Kucera | Apr. 16, 1940 |
| 2,265,605 | Kucera | Dec. 9, 1941 |
| 2,325,643 | Weis | Aug. 3, 1943 |
| 2,355,189 | Tozier | Aug. 8, 1944 |
| 2,369,118 | Cumfer | Feb. 13, 1945 |